Jan. 11, 1949.  C. D. PETERSON ET AL  2,459,093
ANGLE DRIVE TORQUE CONVERTER TRANSMISSION
Filed May 23, 1945  2 Sheets-Sheet 1

INVENTORS
CARL D. PETERSON
BY ALBERT H. DEIMEL

Bodell & Thompson
ATTORNEYS

Jan. 11, 1949.  C. D. PETERSON ET AL  2,459,093
ANGLE DRIVE TORQUE CONVERTER TRANSMISSION
Filed May 23, 1945  2 Sheets-Sheet 2

INVENTORS
CARL D. PETERSON
BY ALBERT H. DEIMEL

Bodell & Thompson
ATTORNEYS

Patented Jan. 11, 1949

2,459,093

UNITED STATES PATENT OFFICE 2,459,093

ANGLE DRIVE TORQUE CONVERTER TRANSMISSION

Carl D. Peterson and Albert H. Deimel, Toledo, Ohio, assignors to Dana Corporation, Toledo, Ohio, a corporation of Virginia Application May 23, 1945, Serial No. 595,264

10 Claims. (Cl. 74—189.5)

This invention relates to transmission mechanisms of the type shown in Peterson and Deimel Patent No. 2,369,369, issued February 13, 1945, in which there are two drives between an engine-actuated driving member and the output or driven shaft, one being in one path through a torque converter, which may be connected and disconnected by a friction clutch from the engine drive, and the other being a solid drive shaft, which is connectable to the driven shaft through a normally-disengaged balking clutch, and the driven shaft is connected to an angle shaft through intermeshing bevel gears.

The invention has for its object a particularly simple, compact, as to axial length, and rigid construction, the arrangement of the bevel gear of the angle drive on the driven shaft relative to the jaw or balking clutch and to the bearings for the driven shaft.

The invention further has for its object a control for the power shift means of the friction and the jaw clutches to cut out or disengage the friction clutch, after the jaw clutch has been engaged, and to again throw in the friction clutch, when the jaw clutch has been disengaged.

The invention consists in the novel features and in the combinations and constructions hereinafter set forth and claimed.

In describing this invention, reference is had to the accompanying drawings, in which like characters designate corresponding parts in all the views.

Figure 3 is an enlarged detail sectional view of one of the solenoid-operated air valves.

Figure 1:
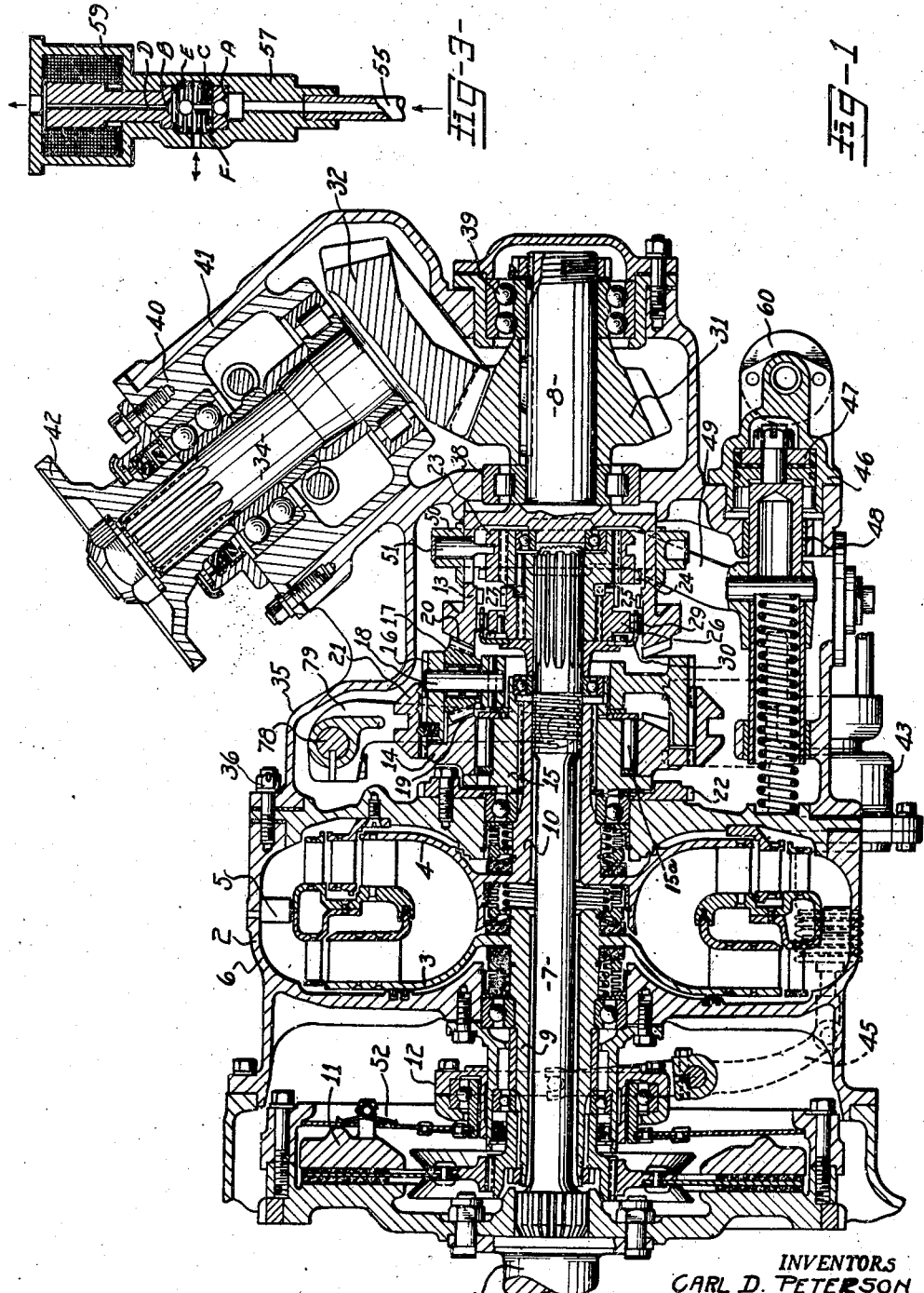
Figure 1 is a longitudinal sectional view of a transmission mechanism embodying this invention.

1 designates an engine-actuated driving member or shaft common to both drives to be hereinafter described. These drives are concentrically arranged, or one includes a shaft located within the other. The other includes a hydraulic torque converter 2 having an impeller or pump 3, a runner or turbine 4 and a stator 5 within a suitable casing 6, which is fixed to or is unitary with the main transmission casing or box. The inner drive includes a shaft 7 extending axially through the outer drive. 8 designates a driven shaft axially alined with the outer and inner drives. The impeller 3 of the converter is provided with an input shaft 9, as a hub or a sleeve, surrounding the shaft 7, and the turbine 4 is provided with an output shaft or sleeve 10 surrounding the shaft 7. These sleeves 9, 10 are mounted in suitable bearings in the casing, and also suitable oil seals are provided for preventing leakage of hydraulic fluid from the converter. The input shaft or sleeve 9 is connected to the driving member 1 through a normally-engaged friction clutch designated generally 11, this including a shiftable collar 12 operated as hereinafter described. The output shaft or sleeve 10 is connected to the driven shaft 8 through suitable motion transmitting mechanism including forward and reverse gearing of any desired construction. The driven shaft 8 includes an annular or hollow head 13 at its inner end.

The transmission mechanism between the output shaft or sleeve 10 of the converter and the driven shaft 8 or the head 13 thereof, as here shown, includes a driving member 14 mounted, through an overruning clutch 15ª, on the head 15, a gear carrier 16 having pinions 17 mounted on radial shafts 18, which pinions mesh with ring gears 19 and 20 on the driving member 14 and the head 13 respectively, and a clutch including a clutch collar 21 having internal, spaced-apart teeth coacting with external splines on the carrier 16 and on the driving member 14 and shiftable from this position in which it is locked with both the carrier and the driving member, into an intermediate neutral position and into a position in which it is interlocked with stationary teeth 22 on the casing of the hydraulic converter. When interlocked with the driving member 14 and the carrier 16, the carrier 16 and driving member 14 will rotate as a unit and the pinions will revolve orbitally without turning about their own axes, and thus transmit through a one to one ratio the movement of the output shaft 10 of the converter to the driven shaft 8. When the collar 21 is shifted into neutral position, no motion will be transmitted. When shifted to the left, so that the teeth of the clutch collar are interlocked, both with the carrier 16 and the stationary teeth 22, the carrier is locked from rotation, so that the pinions are held from orbital movement but are free to rotate about their own axes, and hence transmit reverse movement to the driven shaft 8.

The shaft 7 extends at its inner end into the hollow head 13. Mounted on the inner end of the shaft 7 is a jaw clutch including a shiftable collar 23 splined on the shaft 7 and shiftable axially to carry the clutch teeth 24 into clutching engagement with internal clutch teeth 25 on the head 13. This clutch is preferably a balking clutch to prevent clashing of the clutch teeth 24, 25 and blocking complete shifting movement until the speeds of the two parts to be clutched together cross. The balking ring is of the frictionless type, that is, without the usual slip friction face. 26 designates the balking ring, this being splined on the shaft 7 to have a limited rocking movement relatively thereto and to the clutch collar 23 and provided with a set of balking shoulders 27 for co-acting with the ends 28 of the internal splines of the collar 23, which ends are a second set of balking shoulders. The balking ring is provided with peripheral cams and is the inner race of an overrunning clutch, the outer race of which is the inner cylindrical face of the head 13. 29 designates the rollers of the overrunning clutch, and 30 the cage thereof. The frictionless balking ring clutch per se forms no part of this invention. It is sufficient to say that when the drive is through the converter and the balking clutch is disengaged, that is, when the speeds of the shaft 7 and driven shaft 8 are different, the balking teeth or shoulders 27, 28 will be in balking position. However, when the shift is being made from converter drive to drive through the shaft 7, the engine will be momentarily decelerated, thus slowing down the shaft 1, while the head 13 will drift ahead under the momentum of the vehicle, due to the overrunning clutch 15a, and in so doing, its speed will increase over that of the shaft 7, so that the head 13 through the rollers 29 will ride up and wedge on the cams of the balking ring, and as the speeds cross, will rock the balking ring, carrying the blocking shoulders out of blocking position, permitting complete shifting-in of the collar 23 to interlock the teeth 28 with the teeth 27.

The angle drive includes intermeshing bevel gears 31 and 32 mounted respectively on the shaft 8 and the angle shaft 34, the bevel gear 31 being located in the rear of the clutch collar 23. The transmission is enclosed in a suitable main box or casing 35 to which the casing for the converter is secured, as by screws 36, and this casing 35 has spaced bearings at 38 and 39 for the driven shaft 8 in front of and in the rear of the bevel gear 31, the bearing 38 being located between and close to the head 3 or the clutch collar 23 and the bevel gear 31, so that the bevel gear 31 from which the drive is taken through the angle shaft as well as the joint or coupling between the shafts 7, 8, when clutched together, is rigid and compact. The angle shaft 34 is mounted in a suitable cage 40 mounted in a casing section 41 between the bearings 38, 39 for the driven shaft 8. It is unitarily secured to and preferably integral with the casing 35. The angle shaft 34 is here shown as provided with one section 42 of a universal joint. As will be understood, it is connected to a universal joint section on a propeller shaft.

The clutch collars 12 and 23 are shifted by power mechanism, the clutch collar 12 being shifted out to disengage the converter clutch 11 when the jaw or balking ring clutch collar 23 is shifted into engaged position. The particular form of power shifting mechanism forms no part of this invention.

43 designates a cylinder having a piston 44 therein, the rod of which is connected to a lever 45 having a fork co-acting with the shiftable collar 12 of the friction clutch 11. 46 designates a cylinder having a piston 47 therein, the rod 48 of which is connected to a sliding fork 49 co-acting with a collar 50 slidable axially on the head 13 and having inwardly extending studs 51 working in a groove in the jaw clutch collar 23. The clutch 11 is spring biased, as by springs 52, to be engaged, except when disengaging force is applied and maintained. The clutch collar 23 or the fork 49 thereof is spring biased, as by the spring 53, to be normally disengaged and held disengaged until a shifting-in force is applied and maintained, that is, the clutch 11 remains engaged until power fluid flows to the cylinder 43 and the clutch collar 23 remains disengaged until motive power flows to the cylinder 46. The motive power is preferably air supplied from a suitable source through a pipe 54 having branches 55, 56 to the cylinders 43 and 46 respectively, these branches having control valves 57 and 58 therein. The valves are of the combined intake and exhaust type and of any suitable construction. They are operated by electro-responsive means, as solenoids 59 and 60 respectively, which are connected in circuits controlled by switches, as will be presently described. Each valve 57 or 58 and the solenoid for operating it is of standard construction. They are alike. Referring to Figure 3, in which the valve 57 is illustrated, the valve includes a valve member in the general form of a dumb-bell, one ball of which seats, as the lower ball, on the lower side of the lower seat A and the upper ball of which seats on the lower side of the seat B, which is the lower end of the core of the magnet of the solenoid 59. The core is pulled vertically in Figures 2 and 3, when the magnet is energized, opening the lower ball of the dumb-bell shaped valve member C permitting air to pass from the supply pipe 55 to the cylinder 43 to actuate the piston therein. The upper ball of the valve member C is now sealed, closing an exhaust passage D extending axially through the core. When the circuit to the magnet is opened, the spring E acting on the end of the core reacts and the pressure of the air on the lower ball closes it against its seat. The seat at the end of the core moves away from the upper ball, thus opening the cylinder 43 to the outlet of air. It remains in this position until the solenoid is again energized. A spring F acts on the valve member C to return it to closed position and also to stabilize it or hold it upright.

Figure 2:
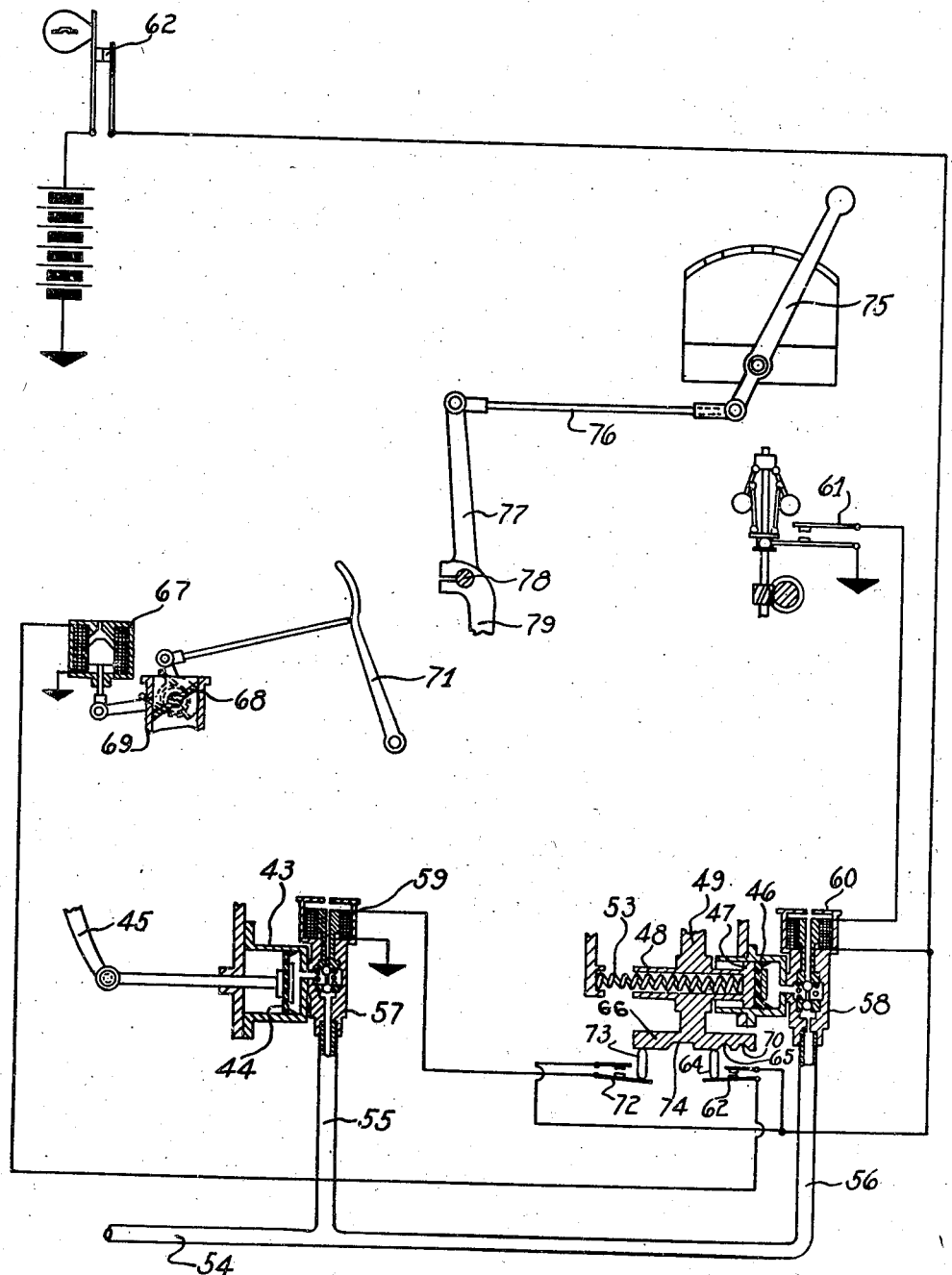
Figure 2 is a diagrammatic view of the control for the friction clutch through which power is transmitted to the converter and the jaw or balking clutch through which power is transmitted directly to the driven shaft.

The length of the stem of the dumb-bell valve member is such that when the lower ball controlling the intake of air is on its seat, the upper ball is spaced apart from the seat at the end of the core. The construction of the valve itself forms no part of this invention. The circuit for the solenoid 60 also includes a governor switch 61 operated by the speed of the driven shaft 34, this circuit also having a suitable hand or manually-operated switch 62 therein, which may be an ignition switch and operated only when the ignition key is turned to "on" position. Normally when the speed is through the converter below direct drive speed, the switch 61 will be open. When, however, the speed reaches a predetermined high through the converter, the switch 61 will be closed by the action of the governor, and hence the solenoid 60 energized to operate the valve 58 to the intake of air from the pipe 56 and closed to the exhaust of air, so that air enters the cylinder 46 and shifts the piston 47 therein. However, as the speeds are differential, the balking ring 26 blocks shifting-in of the clutch teeth 24 into mesh with the clutch teeth 25. The shifting-in of the clutch collar 23 to balk position shifts the fork 49 one step to the left, so that a switch 62 is closed by a pin or poppet 64 dropping into a notch 65 in a cam head 66 on the fork 49. The closing of the switch 62 closes a circuit through the ignition switch to an electro-responsive device or solenoid 67, which closes the throttle 68 in the manifold 69 of the engine, which actuates the drive shaft 1, thus causing the engine to be decelerated. Hence, the shaft 7 slows down while the shaft 8 is free to rotate under the momentum of the vehicle, and in so doing, cause the balking ring, through its overrunning clutch, to be shifted, thus carrying the balking shoulders 27 out of balking position, permitting complete shifting in of the fork 49 against the action of the spring 53. When shifting is completed, the pin 64 rides up on the hump 70 of the cam 66 and again opens the switch 62, so that the throttle may be operated by the regular accelerator pedal 71. When the shifting-in of the clutch collar 23 is thus completed, an additional normally-open switch 72 is closed, this being in the circuit leading to the solenoid 59 which controls the friction clutch 11. The switch 72 is closed at the end of the shifting-in movement by reason of the pin 73 dropping into a notch 74 in the cam 66. When the switch 72 is closed, and hence the solenoid 59 energized, the valve 57 is open to permit air to flow from the branch 55 into the cylinder 43 and actuate the piston 44 therein to throw out and hold the clutch collar 12 against the action of the spring 52. Hence, the friction clutch 11 is disengaged immediately after the jaw clutch collar 23 is engaged and the clutch 11 is held disengaged as long as the balking ring clutch is engaged. The balking ring clutch may be disengaged when the speed drops below a predetermined speed, so that the governor opens the switch 61 controlling the solenoid 60, whereupon the valve 58 being closed to the intake of air and open to the exhaust of air from the cylinder 46, will permit the spring 53 to re-act and shift out the jaw clutch collar 23. The shifting out causes the pin 73 to ride out of the notch 74 causing the pin to open the switch 72, thus de-energizing the solenoid 59 and permitting air to exhaust from the clutch cylinder 43 so that the springs 52 will re-engage the friction clutch 11. Also, the shifting out of the clutch collar 23 restores the cam 66 relatively to the pin 64, as seen in Figure 2.

The forward and reverse collar 21 is operated by a suitable hand lever 75, which is connected by links 76 to a rock arm 77 on the shaft 78 on which the fork 79 for the collar is mounted. During normal running, that is, in all forward speeds, the lever 75 is in forward position and the clutch collar 21 is in the position shown in Figure 1.

Owing to the arrangement of the angle drive relative to the bearings 38, 39 for the driven shaft 8 and the relative arrangement of the head 13 and the balk clutch, the transmission is of relatively short axial length and the angle drive rigidly supported.

What we claim is:

1. In a transmission mechanism, outer and inner concentric drives, a drive member common to both drives and a driven shaft axially alined with the outer and inner drives, the outer drive including a hydraulic torque converter having input and output shafts, a normally engaged clutch between the drive member and the input shaft of the converter, motion transmitting means between the converter output shaft and the driven shaft including an overrunning clutch permitting the driven shaft to overrun the output shaft of the converter, when rotating faster than the same, the inner drive including a shaft extending axially through the input and output shafts of the converter, a normally disengaged jaw clutch for connecting the driven shaft directly to the inner drive shaft including a shiftable collar operable to engage and disengage the jaw clutch, an angle drive including intermeshing bevel gears, one of which is mounted on the driven shaft, and a casing for the transmission having bearings on opposite sides of the bevel gear on the driven shaft in an axial direction, the bearing on one side of the bevel gear being located between the shiftable clutch collar and the bevel gear.

2. In a transmission mechanism, outer and inner concentric drives, a drive member common to both drives and a driven shaft axially alined with the outer and inner drives, the outer drive including a hydraulic torque converter having input and output shafts, a normally engaged clutch between the drive member and the input shaft of the converter, motion transmitting means between the converter output shaft and the driven shaft including an overrunning clutch permitting the driven shaft to overrun the output shaft of the converter, when rotating faster than the same, the inner drive including a shaft extending axially through the input and output shafts of the converter, a normally disengaged jaw clutch for connecting the driven shaft directly to the inner drive shaft including a shiftable collar operable to engage and disengage the jaw clutch, an angle drive including intermeshing bevel gears, one of which is mounted on the driven shaft, a casing for the transmission having bearings on opposite sides of the bevel gear on the driven shaft in an axial direction, the bearing on one side of the bevel gear being located between the shiftable clutch collar and the bevel gear, and a casing for the angle drive unitary with the former casing.

3. In a transmission mechanism, outer and inner concentric drives, a drive member common to both drives and a driven shaft axially alined with the outer and inner drives, the outer drive including a hydraulic torque converter having input and output shafts, a normally engaged clutch between the drive member and the input shaft of the converter, motion transmitting means between the converter output shaft and the driven shaft including an overrunning clutch permitting the driven shaft to overrun the output shaft of the converter, when rotating faster than the same, the inner drive including a shaft extending axially through the input and output shafts of the converter, a normally disengaged jaw clutch for connecting the driven shaft directly to the inner drive shaft including a shiftable collar operable to engage and disengage the jaw clutch, and an angle drive including intermeshing bevel gears, one of which is mounted on the driven shaft, the jaw clutch being located adjacent the bevel gear on the driven shaft.

4. In a transmission mechanism, outer and inner concentric drives, a drive member common to both drives and a driven shaft axially alined with the outer and inner drives, the outer drive including a hydraulic torque converter having input and output shafts, a normally engaged clutch between the drive member and the input shaft of the converter, motion transmitting means between the converter output shaft and the driven shaft including an overrunning clutch permitting the driven shaft to overrun the output shaft of the converter, when rotating faster than the same, the inner drive including a shaft extending axially through the input and output shafts of the converter, a normally disengaged jaw clutch for connecting the driven shaft directly to the inner drive shaft including a shiftable collar operable to engage and disengage the jaw clutch, an angle drive including intermeshing bevel gears, one of which is mounted on the driven shaft, the jaw clutch being located adjacent the bevel gear on the driven shaft, and a casing for the transmission having bearings for the driven shaft on opposite sides, in an axial direction of the bevel gear on the driven shaft and adjacent the same.

5. In a transmission mechanism, outer and inner concentric drives, a drive member common to both drives and a driven shaft axially alined with the outer and inner drives, the outer drive including a hydraulic torque converter having input and output shafts, a normally engaged clutch between the driving member and the input shaft of the converter, motion transmitting means between the converter output shaft and the driven shaft including an overrunning clutch permitting the driven shaft to overrun the output shaft of the converter, when rotating faster than the same, the inner drive including a shaft extending axially through the input and output shafts of the converter, a normally disengaged jaw clutch for connecting the driven shaft directly to the inner drive shaft including a shiftable collar operable to engage and disengage the jaw clutch, an angle drive including intermeshing bevel gears, one of which is mounted on the driven shaft, the jaw clutch being located in front of and adjacent the bevel gear on the driven shaft, a casing for the transmission having bearings for the driven shaft on opposite sides of the bevel gear on the driven shaft in an axial direction and adjacent the same, and a casing supporting the angle drive mounted on the casing between said bearings.

6. In a transmission mechanism, inner and outer concentric drives, a drive member common to both drives, a driven shaft axially alined with the outer and inner drives, the outer drive including a hydraulic torque converter having input and output shafts, a normally engaged clutch between the drive member and the input shaft, motion transmitting means between the converter output shaft and the driven shaft including an overrunning clutch which permits the driven shaft to overrun the output shaft, the inner drive including a shaft extending axially through the input and output shafts, the driven shaft having a hollow head at its inner end and the inner shaft extending axially into the hollow head and radially spaced therefrom, a normally disengaged jaw clutch between the driven shaft and the inner shaft located within the head and including a shiftable collar operable to engage and disengage the jaw clutch, and an angle drive including intermeshing bevel gears, one of which is mounted on the driven shaft adjacent the head thereof.

7. In a transmission mechanism, inner and outer concentric drives, a drive member common to both drives, a driven shaft axially alined with the outer and inner drives, the outer drive including a hydraulic torque converter having input and output shafts, a normally engaged clutch between the drive member and the input shaft, motion transmitting means between the converter output shaft and the driven shaft including an overrunning clutch which permits the driven shaft to overrun the output shaft, the inner drive including a shaft extending axially through the input and output shafts, the driven shaft having a hollow head at its inner end and the inner shaft extending axially into the hollow head and radially spaced therefrom, a normally disengaged jaw clutch between the driven shaft and the inner shaft located within the head and including a shiftable collar operable to engage and disengage the jaw clutch, an angle drive including intermeshing bevel gears, one of which is mounted on the driven shaft adjacent the head thereof, and a casing having bearings for the driven shaft on opposite sides of the bevel gear thereon, the bearing in front of the bevel gear being in the rear of and adjacent said head, and a casing for the angle drive mounted on the transmission casing between said bearings.

8. In a transmission mechanism, outer and inner concentric drives, a drive member common to both drives and a driven shaft axially alined with the outer and inner drives, the outer drive including a hydraulic torque converter having input and output shafts, a normally engaged friction clutch between the drive member and the input shaft of the converter, motion transmitting means between the output shaft of the converter and the driven shaft including an overrunning clutch permitting the driven shaft to overrun the output shaft of the converter, when rotating faster than the same, the inner drive including a shaft extending axially through the input and output shafts of the converter, a normally disengaged jaw clutch for connecting the driven shaft directly to the inner drive shaft including a shiftable collar operable to engage and disengage the jaw clutch, an angle drive including intermeshing bevel gears, one of which is mounted on the driven shaft, power means for shifting said clutches, and a control for the power means including means for controlling the shifting out of the friction clutch by its power means, after the jaw clutch has been shifted into engaged position by its power means, and vice-versa.

9. In a transmission mechanism, outer and inner concentric drives, a drive member common to both drives and a driven shaft axially alined with the outer and inner drives, the outer drive including a hydraulic torque converter having input and output shafts, a normally engaged friction clutch between the drive member and the input shaft of the converter, motion transmitting means between the output shaft of the converter and the driven shaft including an overrunning clutch permitting the driven shaft to overrun the output shaft of the converter, when rotating faster than the same, the inner drive including a shaft extending axially through the input and output shafts of the converter, a balking ring clutch for connecting the driven shaft directly to the inner drive shaft including a frictionless balking ring and a shiftable collar operable to engage and disengage the balking clutch, and an angle drive including intermeshing bevel gears, one of which is mounted on the driven shaft, the balking clutch being located adjacent the bevel gear on the driven shaft.

10. In a transmission mechanism, outer and inner concentric drives, a drive member common to both drives and a driven shaft axially alined with the outer and inner drives, the outer drive including a hydraulic torque converter having input and output shafts, a normally engaged friction clutch between the drive member and the input shaft of the converter, motion transmitting means between the output shaft of the converter and the driven shaft including an overrunning clutch permitting the driven shaft to overrun the output shaft of the converter, when rotating faster than the same, the inner drive including a shaft extending axially through the input and output shafts of the converter, a balking ring clutch for connecting the driven shaft directly to the inner drive shaft including a frictionless balking ring and a shiftable collar operable to engage and disengage the balking clutch, an angle drive including intermeshing bevel gears, one of which is mounted on the driven shaft, the balking clutch being located in front of and adjacent the bevel gear on the driven shaft, and a transmission casing having bearings for the driven shaft on opposite sides of the bevel gear thereon, one of said bearings being located between the shiftable clutch collar and the bevel gear on the driven shaft.

CARL D. PETERSON.
ALBERT H. DEIMEL.

REFERENCES CITED

The following references are of record in the file of this patent:

UNITED STATES PATENTS

| Number | Name | Date |
|---|---|---|
| 2,298,649 | Russell | Oct. 13, 1942 |
| 2,325,876 | Pollard | Aug. 3, 1943 |
| 2,369,126 | Baker | Feb. 13, 1945 |
| 2,369,369 | Peterson et al. | Feb. 13, 1945 |